United States Patent Office 3,210,440
Patented Oct. 5, 1965

3,210,440
AIR-DRYING UNSATURATED POLYESTERS PREPARED FROM DICARBOXYLIC ACIDS AND 1,1-BIS - [HYDROXYMETHYL]CYCLO - S - HEXENES WITH METAL DRIERS
Hans Batzer, Arlesheim, Erwin Nikles, Basel, Helmut Pfannmueller, Riehen, and Gustav Widmer, Basel, Switzerland, assignors to Ciba Limited, Basel, Switzerland, a Swiss firm
No Drawing. Filed Nov. 3, 1959, Ser. No. 850,508
4 Claims. (Cl. 260—863)

This invention relates to unsaturated polyesters, to processes for their production and to the use of such polyesters.

It is known to produce unsaturated polyesters by condensing α,β-unsaturated dicarboxylic acids with polyhydric alcohols. Such unsaturated polyesters together with vinyl compounds, such as styrene, can be cured to form non-tacky copolymers but these cures must be effected in the absence of air. The production of thin lacquer films of such copolymers is accordingly very difficult.

German patent application No. 1,028,336 in the printed form in which it became open to inspection, describes polyesters of α,β-unsaturated dicarboxylic acids and endomethylene tetrahydrophthalyl alcohol (1,6-bis-[hydroxymethyl]-2,5-endomethylene-cyclo-3-hexene) which, after copolymerization with polymerizable compounds such as styrene, with free access of air, produce completely hard and non-tacky surfaces.

Experiments which have been carried out show that polyesters of α,β-unsaturated dicarboxylic acids and 1,1-bis - [hydroxymethyl] - 2,5 - endomethylene - cyclo - 3-hexene, which is isomeric with endomethylene tetrahydrophthalyl alcohol, do not have any air-drying properties; polyesters of α,β-unsaturated dicarboxylic acids and 1,1 - bis - [hydroxymethyl] - 6 - methyl - 2,5 - endomethylene-cyclo-3-hexene behave similarly. From the behaviour of these polyesters, it was to be presumed that the presence of the two hydroxymethyl groups in the 1-1-position of the cyclohexene ring would inevitably lead to non-air-drying properties.

It has now very surprisingly been found that polyesters of dicarboxylic acids and 1,1-bis-[hydroxymethyl]-cyclohexene and its homologues, with the exception of the derivatives substituted in the 2,5-position by a methylene bridge, on the other hand have air-drying properties.

The compound 1,1-bis-[hydroxymethyl]-cyclo-3-hexene and its 6-methyl derivative are obtainable by Diels-Alder addition of butadiene to acrolein and crotonaldehyde respectively, and subsequent reaction with formaldehyde, and since this process is less costly and affords better yields than the known process for producing endomethylene tetrahydrophthalyl alcohol, the discovery of the new class of air-drying polyesters which are derived from 1,1-bis-[hydroxymethyl]-cyclohexene or its homologues or its homologues represents an important step forward in the art.

According to the present invention, therefore, there is provided a new class of unsaturated polyesters which are the polyesters of dicarboxylic or polycarboxylic acids and unsaturated dialcohols of the general Formula 1;

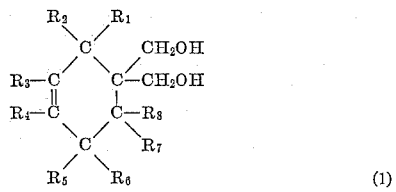

(1)

wherein $R_1$, $R_2$, $R_3$, $R_4$, $R_5$, $R_6$, $R_7$ and $R_8$ represent hydrogen atoms or monovalent substituents, such as halogen atoms, alkoxy groups or aliphatic, cycloaliphatic, araliphatic or aromatic hydrocarbon radicals. In certain cases, other dialcohols or polyalcohols can be incorporated into the new polyesters by condensation.

According to a further feature of the invention the new unsaturated polyesters are obtained by condensing dicarboxylic or polycarboxylic acids or their functional derivatives with unsaturated dialcohols of the general Formula 1 and if desired also with other diols or polyols.

The polyesters according to the invention may be derived from saturated or unsaturated dicarboxylic or polycarboxylic acids. The following are examples of saturated aliphatic, cycloaliphatic and aromatic dicarboxylic and polycarboxylic acids which may be employed; oxalic acid, succinic acid, glutaric acid, adipic acid, pimelic acid, suberic acid, azelaic acid, sebacic acid, hexahydrophthalic acid, tricarballylic acid, phthalic acid, isophthalic acid, terephthalic acid, 2,6-naphthalene-dicarboxylic acid, diphenyl-o,o'-dicarboxylic acid, ethylene glycol-bis(p-carboxyphenyl)-ether and pyromellitic acid. Examples of unsaturated dicarboxylic and polycarboxylic acids which may be employed are: maleic acid, fumaric acid, mesaconic acid, citraconic acid, itaconic acid, tetrahydrophthalic acid and aconitic acid. Examples of functional derivatives of these acids are the corresponding acid halides, acid esters and, more especially, acid anhydrides.

Examples of unsaturated dialcohols of general Formula 1 are: 1,1-bis-[hydroxymethyl]-cyclo-3-hexene, 1,1-bis-[hydroxymethyl] - 6 - methyl-cyclo-3-hexene and 1,1-bis-[hydroxymethyl]-2,4,6-trimethyl-cyclo-3-hexene and 1,1-bis-[hydroxymethyl]-4-chloro-cyclo-3-hexene.

Examples of diols and polyols which can in certain cases be incorporated by condensation together with the dialcohols of general Formula 1 are: alkylene glycols, e.g., ethylene glycol, diethylene glycol, triethylene glycol, propylene-1,2-glycol, propylene - 1,3 - glycol, butane-1,4-diol, 2-methyl-pentane-2,4-diol, pentane-1,5-diol, hexane-1,6-diol; glycerine, diglycerine, trimethylolethane, trimethylolpropane, butane-1,2,4-triol, hexantriol and pentaerythritol.

The polyesters according to the invention may be prepared by heating the starting components, if necessary in the presence of esterifying catalysts such as toluene-p-sulfonic acid, the water of reaction forming during the condensation being preferably continuously removed by means of a stream of inert gas or of an auxiliary solvent, such as benzene, toluene or chlorobenzene, forming an azeotrope with the water.

In the presence of cobalt compounds, for example cobalt naphthenate or cobalt (II)-ethyl hexanate, the polyesters of the present invention are strongly reactive at room temperature in the presence of oxygen and produce, for example, coatings which dry in air and which are already dust-dry and resistant to pressure after a few hours. Such coatings, after at most of a few days, are resistant to scratching and substantially insoluble in solvents and water. The drying process can be accelerated by heating. Furthermore, other metal driers, such as for example iron or nickel driers, can be used, but the latter usually necessitate longer drying periods.

According, therefore, to a further feature of the invention there are provided novel compositions of matter which dry on oxidation, which comprise polyesters according to the present invention and also metal driers.

Coatings, films and similar products which are obtained from the unsaturated polyesters of the invention in the presence of a cobalt drier and which are dried in air are usually odorless, crystal-clear, insoluble in many organic solvents and resistant to water. However, the unsaturated polyesters may have added thereto compounds which are derived from air-drying oils and which per se are already considered to be driers and thus have air-drying properties, such as for example linseed oil, alkyd resins or styrene-treated oils.

Compounds which dry by oxidation and which contain other compounds polymerizable by treatment with peroxides, for example vinyl ester, acrylic or methacrylic acid esters, acrylonitrile and other unsaturated polyesters and more especially styrene, may be added to the unsaturated esters of the present invention to yield products having particularly valuable properties. Such products containing a polymerization catalyst, such as benzoyl peroxide, di-tert-butyl peroxide, lauryl peroxide, hydroxycyclohexyl hydroperoxide or, preferably, methylethylketone peroxide, as well as a metal drier, are excellently suitable as casting resins, lamination resins, trowelling compounds and lacquer bases. Castings, coatings and the like obtained therefrom dry out to a completely non-tacky condition on exposure to air.

The quantity of the unsaturated polyester of the present invention which is to be included in such products depends on the properties of the other materials present and on the standards which are set for the products, and can be varied within wide limits. Such mixtures may also contain solvents and/or additives having a modifying action, such as plasticisers or organic or inorganic fillers or pigments.

Lacquers which contain the unsaturated polyesters of the present invention (if necessary in admixture with other unsaturated polyesters) in combination with polymerizable compounds such as styrene, yield lacquer films of which the period of time required before the lacquer films become dust-dry may be shortened by adding wax-like substances, such as paraffin. If salts of higher fatty acids and drying metals, such as for example Co-, Mg-, Ca-, Pb-, Fe-, Ni-, Zn-, or Al-palmitate, -stearate or -montanate are used as the wax-like substance, these act simultaneously as drier and as means for improving the polish of the lacquer film.

By addition of inhibitors, such as methylene blue, hydroquinone, tert-butyl catechol or, preferably, very small quantities of copper salts, it is also possible to improve the stability of the uncatalysed products containing a polyester according to the invention when these compounds are stored under warm conditions, as well as to improve the pot-life of the corresponding catalysed compounds.

By treating the polyesters of the present invention with epoxidising agents, such as peracetic acid or perbenzoic acid, the double bonds in the cyclohexene rings may easily be epoxidised. There are thus obtained polyesters containing epoxide groups and these also have very valuable properties. They can be cross-linked or cured by adding conventional hardeners for epoxy resins, such as amines and, more especially carboxylic acid anhydrides, and they can be used for the production of casting and laminating resins, lacquers and adhesives. Where the polyesters concerned are derived from unsaturated dicarboxylic or polycarboxylic acids, the polymerizable ethylenic double bonds of the carboxylic acid component are substantially maintained during the epoxidation, so that the epoxidised esters are, in addition, capable of being copolymerized with monomeric compounds, such as, more especially, styrene.

The following examples will serve to illustrate the invention. Unless otherwise indicated, parts represent parts by weight and percentages represent percentages by weight; the temperatures are given in degrees centigrade.

*Example 1*

28.4 parts of 1,1-bis-[hydroxymethyl]-cyclo-3-hexene and 29.2 parts of adipic acid are condensed in 250 parts of toluene with 0.5 part of toluene-p-sulfonic acid in a stream of nitrogen and in a cyclic distillation apparatus at a bath temperature of 140°. After 18 hours, 5.5 parts of water have separated out. After adding another 0.25 part of toluene-p-sulfonic acid, condensation is carried out for another 6 hours. The polyester which forms is precipiated by pouring into methanol and is dried in vacuo. The product shows, in chloroform at 20°, a relative viscosity $$\frac{\eta \text{ spec}}{C} = 1.52 \cdot 10^{-2}$$

*Example 2*

85.2 parts of 1,1-bis-[hydroxymethyl]-cyclo-3-hexene, 43.8 parts of adipic acid and 29.3 parts of maleic anhydride are condensed as described in Example 1. The solution is filtered and partially concentrated by evaporation in vacuo. The polyester is precipitated by pouring into methanol and is freed from the residual solvent in vacuo.

*Example 3*

31.2 parts of 1,1-bis-[hydroxymethyl]-6-methylcyclo-3-hexene and 29.2 parts of adipic acid are condensed with 0.5 part of toluene-p-sulfonic acid in 250 parts by volume of toluene according to Example 1. The solution is concentrated by evaporation to half its volume. The polyester which forms is precipitated by pouring into methanol and is freed from the residual solvent in vacuo. The product which is obtained shows, in chloroform at 20°, a relative viscosity $$\frac{\eta \text{ spec}}{C} = 1.29 \cdot 10^{-2}$$

*Example 4*

A mixture of 568 parts of 1,1-bis-[hydroxymethyl]-cyclo-3-hexene, 196 parts of maleic anhydride and 292 parts of adipic acid is melted in a stream of nitrogen. After adding 5 parts of toluene-p-sulfonic acid, the mixture is condensed for 20 hours at a bath temperature of 132° under a vacuum of 20 mm. Hg, the water formed distilling off. The condensate which is obtained is transparent, clear and hard.

*Example 5*

624 parts of 1,1-bis-[hydroxymethyl]-6-methyl-cyclo-3-hexene, 196 parts of maleic anhydride, 207 parts of phthalic anhydride and 87.5 parts of adipic acid are melted in a stream of nitrogen and then condensed for 16 hours while stirring and in the presence of 5 g. of toluene-p-sulfonic acid at a bath temperature of 148° and under a vacuum of 20 mm. Hg. A slightly yellowish, clear and hard resin is obtained.

*Example 6*

49 parts of maleic acid, 148 parts of phthalic anhydride, 73 parts of adipic acid, 31 parts of glycol, 106 parts of diethylene glycol and 71 parts of 1,1-bis-[hydroxymethyl]-cyclo-3-hexene are melted in a stream of nitrogen. The mixture is heated to 240° over a period of 12 hours. The mixture is further condensed for 2 hours at 20 mm. Hg and 240°, a total of 39 parts of water distilling off. The polyester which forms is clear and liquid.

*Example 7*

151 parts of fumaric acid, 252 parts of phthalic anhydride, 124 parts of ethylene glycol, 142 parts of 1,1-bis-[hydroxymethyl]-cyclo-3-hexene and 0.5 part of hydroquinone are melted in a stream of nitrogen at a bath temperature of 140° (approximately half an hour). The bath temperature is then raised within 2 hours to 220° while stirring. After another 1½ hours at 220°, the bath temperature is raised to 240° and kept at this temperature for 4 hours. The bath is then allowed to cool to 200° and a vacuum of 25 mm. Hg is applied for 1½ hours at a bath temperature of 200°. The polyester which is obtained is slightly tinted light yellow, has an acid number of 22 and solidifies on cooling.

Example 8

151 parts of fumaric acid, 252 parts of phthalic anhydride, 124 parts of ethylene glycol, 156 parts of 1,1-bis-[hydroxymethyl]-6-methyl-cyclo-3-hexene and 0.5 part of hydroquinone are condensed in a manner analogous to that indicated in Example 7. The light yellow polyester solidifies on cooling and has an acid number of 30.

Example 9

116 parts of fumaric acid, 296 parts of phthalic anhydride, 155 parts of ethylene glycol, 71 parts of 1,1-bis-[hydroxymethyl]-cyclo-3-hexene and 0.36 part of hydroquinone are melted in a stream of nitrogen at a bath temperature of 140° (about half an hour). The bath temperature is then raised within 2 hours to 220° while stirring. After another 1½ hours, the bath temperature is raised to 240° and this temperature is maintained for 4½ hours. The bath temperature is then cooled to 200° and a vacuum of 25 mm. Hg is applied for 1½ hours at this temperature. After this time, the slightly yellowish polyester (a) has an acid number of 31, a specific viscosity of $0.78 \cdot 10^{-2}$ (measured in chloroform), and solidifies on cooling.

For comparison purposes, two polyesters (b) and (c) were prepared from (b) 1.3 mols of maleic acid; 1.7 mols of phthalic acid; 2.3 mols of ethylene glycol and 1 mol of 1,1-bis-[hydroxymethyl]-6-methyl-2,5-endomethylene-cyclo-3-hexene, and (c) 1.3 mols of maleic acid; 1.7 mols of phthalic acid; 2.3 mols of ethylene glycol and 1 mol of 1,1-bis-[hydroxymethyl]-2,5-endomethylene-cyclo-3-hexene, these ingredients being condensed in the melt and worked up in a manner analogous to that used in the preparation of polyester (a).

70 parts of these polyesters (a), (b) and (c), dissolved in 30 parts of styrene, are mixed with 0.5 part of a cobalt octoate solution in white spirit (12% cobalt metal) and 1 part of methylethylketone peroxide (40% solution in dimethyl phthalate) and hardened for 1 hour in an open glass mould (i) at room temperature and (ii) in a drying chamber at 80°. With polyester (a), hard clear castings with non-tacky surfaces are obtained in both cases. With the polyesters (b) and (c), on the other hand, there are obtained in both cases castings which have surfaces which are still tacky after 1 hour under identical hardening conditions.

Example 10

116 parts of fumaric acid, 296 parts of phthalic anhydride, 168 parts of ethylene glycol, 42.6 parts of 1,1-bis-[hydroxymethyl]-cyclo-3-hexene and 0.36 part of hydroquinone are condensed in the manner analogous to that described in Example 9. After 10 hours the polyester has an acid number of 38 and a specific viscosity of $0.67 \cdot 10^{-2}$ (measured in chloroform). It solidifies on cooling to form a solid, slightly yellowish resin.

Under the same hardening conditions as described in Example 9, hard clear castings with non-tacky surfaces are obtained.

Example 11

The polyesters described in Examples 1, 2 and 3, and also for comparison purposes two known polyesters A and B, and a polyester of adipic acid and 1,1-bis-[hydroxymethyl]-2,5-endomethylene-cyclo-3-hexene (polyester C), the production of A, B and C being described below, are processed as follows to form lacquer solutions:

1 part of the polyester and 0.1 part of a solution of cobalt octoate in chloroform (containing 1% of cobalt metal) are diluted with chloroform to 10 parts by volume.

1 ml. of this resin solution is uniformly spread on a glass sheet measuring 9 x 12 cm. After evaporating the solvent in vacuo, the lacquer film with a thickness of about $10\mu$ is left to stand at room temperature while exposed to air. The following percentage increase in weight due to absorption of oxygen can be observed:

| Polyester | Increase in weight in percent after— | | | | | Comments on film which is formed |
|---|---|---|---|---|---|---|
| | 1 hour | 2 hours | 4 hours | 8 hours | | |
| A | | | | | | No increase in weight, no drying; surface remains tacky. |
| B | | | | | | |
| C | | | | | 5.5 (67 hrs.) | |
| Example 1 | 2.0 | 3.1 | 3.5 | 3.8 | 7.1 (150 hrs.) | Dust dry after 3 hours. |
| Example 2 | 1.2 | 1.5 | 1.6 | 2.3 | 4.1 (45 hrs.) | |
| Example 3 | 1.1 | 2.4 | 2.8 | 3.7 | 6.9 (68 hrs.) | |

Polyesters A, B and C are prepared as follows:

*Polyester A.*—38 parts of propane-1,3-diol and 73 parts of adipic acid are melted in a stream of nitrogen and heated for 20 minutes in a vacuum of 22 mm. Hg to 140°. After adding 450 parts by volume of toluene, the mixture is boiled in a cyclic distillation apparatus until the discharge of condensed toluene is complete. 0.5 part of toluene-p-sulfonic acid is then added and the mixture is condensed under nitrogen for approximately 20 hours at a bath temperature of 140°. The water formed in the reaction is separated out. The polyester is precipitated with petroleum ether and freed from the residual solvent in vacuo.

*Polyester B.*—A mixture of 38 parts of propane-1,3-diol, 24.5 parts of maleic anhydride and 36.5 parts of adipic acid is condensed in a manner analogous to that described in the preparation of polyester A. After cooling, two phases are formed. The lower layer is separated out and the polyester is precipitated therefrom with petroleum ether.

*Polyester C.*—A mixture of 1 mol of adipic acid and 1 mol of 1,1-bis-[hydroxymethyl]-2,5-endomethylene-cyclo-3-hexene is condensed and worked up in a manner analogous to that described in the preparation of polyester A.

Example 12

A lacquer mixture which contains 40.9 parts of styrene, 52.8 parts of the polyester resin prepared according to Example 2, 3.5 parts of cobalt octoate solution in chloroform (containing 1% cobalt metal) and 2.8 parts of commercial tert-butyl hydroperoxide (75%), is applied to a glass sheet in a layer having a thickness of $50\mu$. On standing at room temperature while exposed to air, the following percentage decrease in weight is observed:

| Time | 0 min. | 15 min. | 30 min. | 1 hr. | 2 hrs. | 4 hrs. | 6 hrs. | 24 hrs. |
|---|---|---|---|---|---|---|---|---|
| Weight of the lacquer layer in percent of the applied lacquer solution | 100 | 92.5 | 89.3 | 84.6 | 77.0 | 67.7 | 66.8 | 66.9 |

Thus, about 10 parts of styrene have been incorporated by polymerization. The lacquer layer is dust-dry after 2 hours. It is substantially scratch resistant after two days and remains lustrous, even on being treated with acetone.

Example 13

70 parts of the polyester resin prepared according to Example 6 are mixed with 30 parts of styrene and, after adding 1 part of cobalt octoate solution in chloroform (1% of cobalt metal) and 1 part of 40% solution of methylethylketone peroxide in dimethyl phthalate, is hardened for 1 hour in an open glass mould at 80°. The flexible element which is thus formed has completely non-tacky surfaces.

Example 14

A mixture of 60 parts of the polyester resin prepared according to Example 5 and 40 parts of stabilized styrene is hardened with 1 part of a pasty 50% solution of benzoyl peroxide in dimethyl phthalate at 80° for 24 hours in an open aluminium mould. A completely non-tacky hard element is obtained.

Example 15

A mixture of 60 parts of the polyester resin prepared according to Example 4 and 40 parts of stabilized styrene is hardened with 1 part of the benzoyl peroxide paste described in Example 14 at 80° and in 24 hours. A completely non-tacky flexible element is obtained.

Example 16

A lacquer solution is produced from 100 parts of the polyester prepared according to Example 7, 86.5 parts of styrene, 1 part of cellulose acetobutyrate (20% solution in butyl acetate), 7.5 parts of cobalt octoate solution in butyl acetate (2% cobalt metal) and 5 parts of methylethylketone peroxide (40% solution in dimethyl phthalate) and this lacquer solution is spread on glass sheets and on small wood planks. The lacquer film is dust-dry after 45 minutes at 20° and 65% relative humidity and presents an even, highly lustrous surface; it can be buffed and satisfactorily polished after 24 hours.

Example 17

A lacquer solution is produced from 100 parts of the polyester prepared according to Example 8, 86.5 parts of styrene, 1 part of cellulose acetobutyrate (20% solution in butyl acetate), 7.5 parts of cobalt octoate solution in butyl acetate (2% of cobalt metal) and 5 parts of methylethylketone peroxide (40% solution in dimethyl phthalate) and this lacquer solution is applied to glass sheets and small wooden planks. The lacquer film is dust-dry after 50 minutes at 20° and 65% relative and presents an even, highly lustrous surface; it can be buffed and satisfactorily polished after 24 hours.

Example 18

Elements are cast from 60 parts of the polyester prepared according to Example 9, 40 parts of styrene, 1 part of methylethylketone peroxide (40% solution in dimethyl phthalate), 0.2 part of cobalt octoate solution in white spirit (3.8% cobalt metal) and hardened for 7 days at 20°. The cured castings have hard, non-tacky surfaces and present the following mechanical properties:

| | |
|---|---|
| Bending strength, dry _____kg./mm.$^2$__ | 9.1 |
| Bending strength after being kept for 10 days in cold water at 20° _____kg./mm.$^2$__ | 9.1 |
| Impact bending strength _____cm. kg./cm.$^2$__ | 7.8 |
| E-modulus _____kg./mm.$^2$__ | 380 |
| Compressive strength _____kg./mm.$^2$__ | 12.1 |
| Martens value _____°C__ | 38 |
| Cold water absorption after 10 days, 20° _____percent__ | 0.34 |
| Loss in weight after 10 days, 100° _____do____ | 0.22 |

Example 19

Elements are cast from 60 parts of the polyester prepared according to Example 9, 40 parts of styrene and 1 part of methylethylketone peroxide (40% solution in dimethyl phthalate) and hardened for 2 hours at 100°. The cured castings have hard, non-tacky surfaces and show the following mechanical properties:

| | |
|---|---|
| Bending strength, dry _____kg./mm.$^2$__ | 10.8 |
| Bending strength after being kept for 10 days in cold water at 20° _____kg./mm.$^2$__ | 7.8 |
| Impact bending strength _____cm. kg./cm.$^2$__ | 7.5 |
| E-modulus _____kg./mm.$^2$__ | 520 |
| Compressive strength _____kg./mm.$^2$__ | 17.2 |
| Martens value _____°C__ | 58 |
| Cold water absorption after 10 days, 20° _____percent__ | 0.30 |
| Loss in weight after 10 days, 100° _____do____ | 0.23 |

Example 20

A mixture is produced from 60 parts of the polyester prepared according to Example 9, 40 parts of styrene, 1 part of methylethylketone peroxide (40% solution in dimethyl phthalate) and 0.2 part of a cobalt octoate solution in white spirit (3.8% cobalt metal).

One part of this mixture is coated on a chromium-plated steel plate, covered with a layer of glass fiber matting and alternating layers of resin mixture and glass fiber mats are applied thereto until a loose sandwich element comprising four layers of glass mats is obtained. It is now covered with a chromium-plated steel sheet and the assembly is cured for 7 days at 20° under a load of 0.5 kg./dm.$^2$ to form a glass fiber laminate. The hard laminated plate is non-tacky and has the following properties:

| | |
|---|---|
| Bending strength, dry _____kg./mm.$^2$__ | 23.8 |
| Bending strength after being kept in cold water for 10 days, 20° _____kg./mm.$^2$__ | 21.0 |
| Impact bending strength (40 kg. hammer) cm. kg./cm.$^2$__ | 94 |
| E-modulus _____kg./mm.$^2$__ | 1300 |
| Martens value _____°C__ | 36 |
| Cold water absorption after 10 days 20° _percent__ | 0.55 |
| Loss in weight after 10 days, 100° _____do____ | 0.67 |

Example 21

12 layers of glass fiber fabric are placed while dry in a heated rectangular iron mould box with smooth surfaces and saturated with a resin mixture of 60 parts of the polyester prepared according to Example 9, 40 parts of styrene and 1 part of methylethylketone peroxide (40% solution in dimethyl phthalate). After closing the mould, curing is carried out for 2 hours under a pressure of 20 kg./cm.$^2$ at 100° to form a glass fiber laminate. The hard laminated plate is non-tacky and has the following mechanical properties:

| | |
|---|---|
| Bending strength, dry _____kg./mm.$^2$__ | 20.6 |
| Bending strength, after being kept in cold water for 10 days at 20° _____kg./mm.$^2$__ | 14.7 |
| E-modulus _____kg./mm.$^2$__ | 1965 |
| Martens value _____°C__ | 67 |
| Cold water absorption after 10 days, 20° _percent__ | 1.39 |
| Loss in weight after 10 days, 100° _____do____ | 0.44 |

Example 22

58 parts of the polyester prepared according to Example 3 are dissolved in 350 parts by volume of benzene. After adding 3 parts of anhydrous sodium acetate, 50 parts of 42% peracetic acid are added dropwise in 30 minutes at 30° while cooling and stirring well. After another 75 minutes at 28–30°, the lower aqueous phase is separated out and the solution is washed 6 times with water, using 300 parts on each occasion, until it is neutral. 100 parts of ethyl benzene are then added and the mixture is concentrated by evaporation under a vacuum of 12 mm. Hg and with a bath temperature of 40°. The polyester which remains has an epoxide content of 1.86 epoxide equivalents per kg.

A mixture of 5.0 parts of the epoxidised polyester, 1.2 parts of phthalic anhydride and 0.1 part of bis-(Δ³-tetrahydrobenzyl)-amine gels after 25 minutes at 150°

What is claimed is:

1. An air-drying composition of matter which comprises (a) an unsaturated polyester consisting of recurring intralinear units of the formula

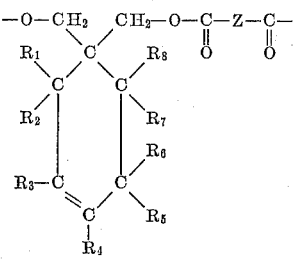

wherein $R_1$, $R_2$, $R_3$, $R_4$, $R_5$, $R_6$, $R_7$ and $R_8$ each are selected from the group consisting of a hydrogen atom and a alkyl group containing 1 to 4 carbon atoms and Z is selected from the group consisting of alkylene, cycloalkylene, alkenylene, cycloalkenylene and arylene radical and (b) a metal drier.

2. An air-drying composition of matter which comprises (a) an unsaturated polyester consisting of recurring intralinear units of the formula

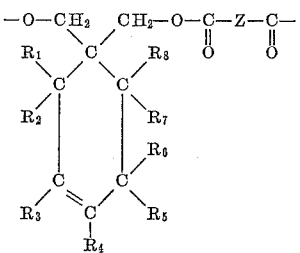

wherein $R_1$, $R_2$, $R_3$, $R_4$, $R_5$, $R_6$, $R_7$ and $R_8$ each are selected from the group consisting of a hydrogen atom and an alkyl group containing 1 to 4 carbon atoms and Z is selected from the group consisting of alkylene, cycloalkylene, alkenylene, cycloalkenylene and arylene radical, (b) a metal drier, (c) an organic peroxide, (d) styrene.

3. An air-drying composition of matter which comprises (a) an unsaturated polyester consisting of recurring intralinear units of the formula

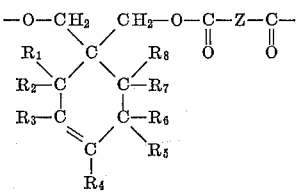

and

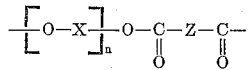

wherein $R_1$, $R_2$, $R_3$, $R_4$, $R_5$, $R_6$, $R_7$ and $R_8$ each are selected from the group consisting of a hydrogen atom and an alkyl group containing 1 to 4 carbon atoms, Z is selected from the group consisting of alkylene, cycloalkylene, alkenylene, cycloalkenylene and arylene radical, X is an alkylene radical, and $n$ is an integer from 1 to 3 and (b) a metal drier.

4. An air-drying composition of matter which comprises an unsaturated polyester consisting of recurring intralinear units of the formula

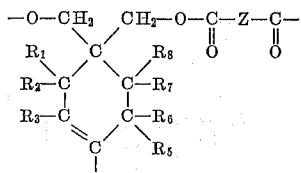

and

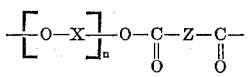

wherein $R_1$, $R_2$, $R_3$, $R_4$, $R_5$, $R_6$, $R_7$ and $R_8$ each are selected from the group consisting of a hydrogen atom and an alkyl group containing 1 to 4 carbon atoms, Z is selected from the group consisting of alkylene, cycloalkylene, alkenylene, cycloalkenylene and arylene radical, X is an alkylene radical, and $n$ is an integer from 1 to 3, (b) a metal drier, (c) an organic peroxide, and (d) styrene.

References Cited by the Examiner

UNITED STATES PATENTS

| | | | |
|---|---|---|---|
| 2,418,290 | 4/47 | Bruson et al. | 260—75 |
| 2,516,309 | 7/50 | Fraser | 260—22 |
| 2,537,375 | 1/51 | Simons et al. | 260—863 |
| 2,819,247 | 1/58 | Lundberg | 260—866 |
| 2,837,498 | 6/58 | Ferstandig | 260—75 |
| 2,858,296 | 10/58 | Stilmar | 260—75 |
| 2,980,649 | 4/61 | Caldwell et al. | 260—75 |
| 2,984,643 | 5/61 | Nischk et al. | 260—862 |

OTHER REFERENCES

Bjorksten, "Polyesters and Their Applications," pub. by Reinhold Corp., 1956, page 168.

WILLIAM H. SHORT, *Primary Examiner.*

DANIEL ARNOLD, *Examiner.*